UNITED STATES PATENT OFFICE.

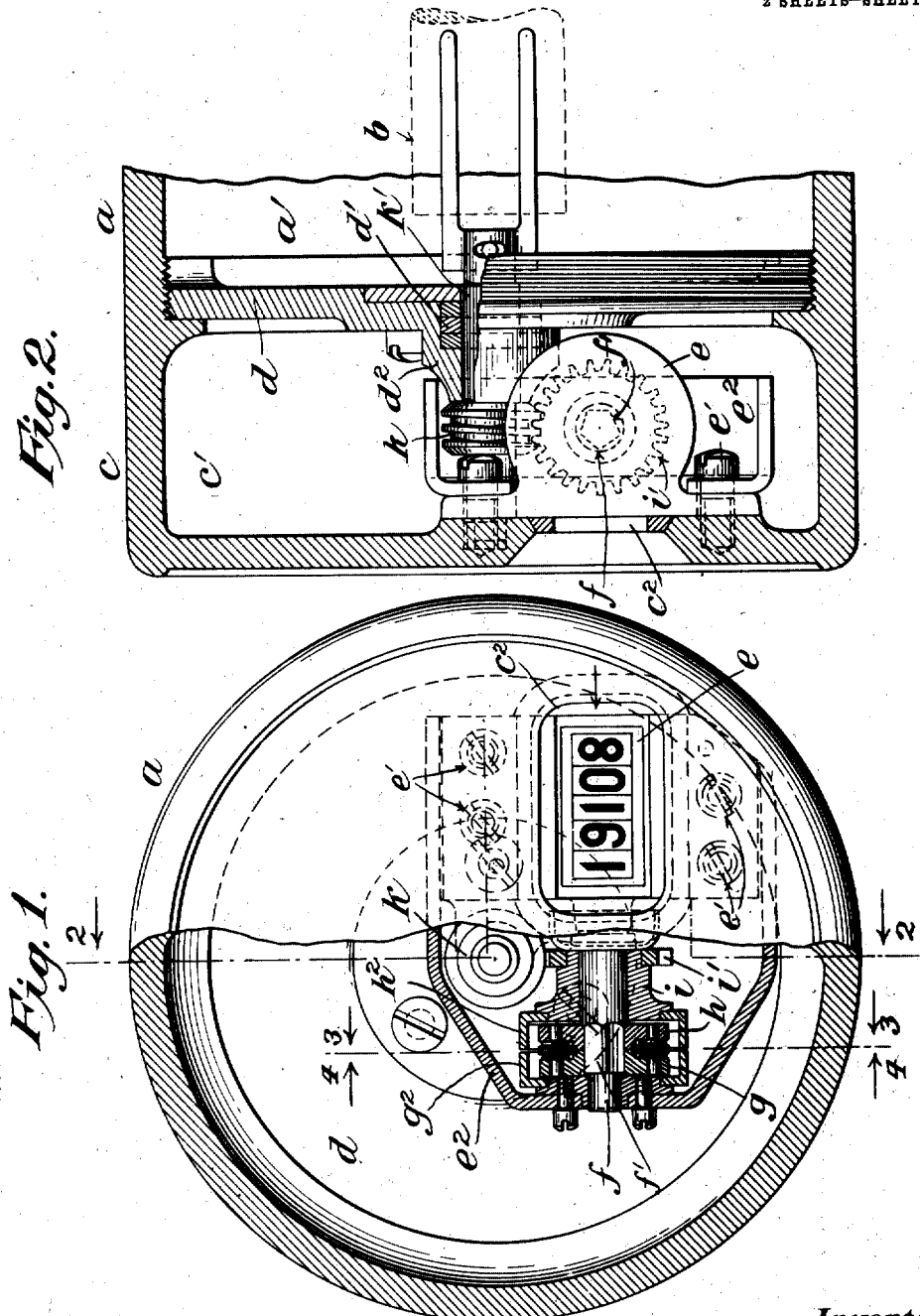

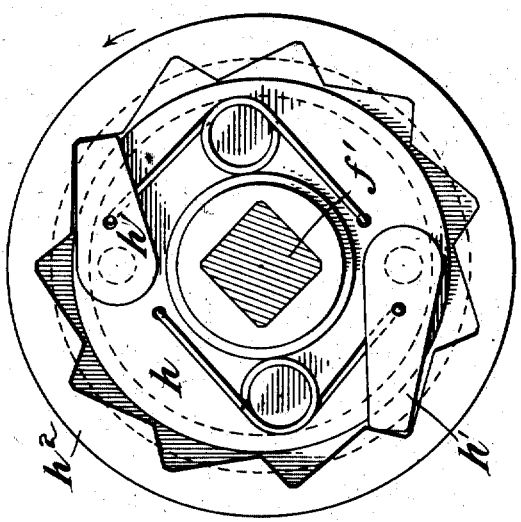
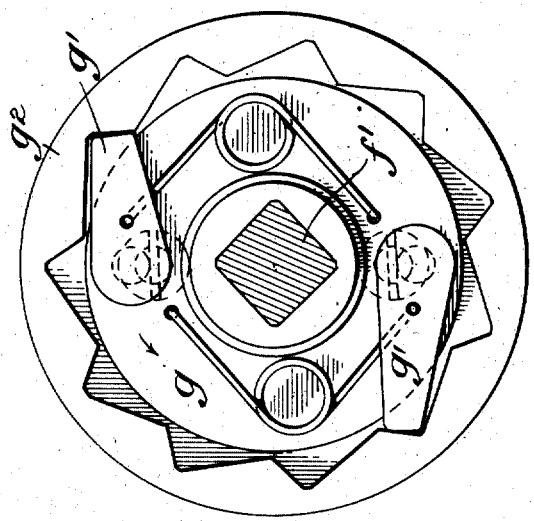

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

ODOMETER.

1,002,015.     Specification of Letters Patent.     Patented Aug. 29, 1911.

Application filed January 12, 1911. Serial No. 602,191.

*To all whom it may concern:*

Be it known that I, CURTIS HUSSEY VEEDER, a citizen of the United States, residing in the city of Hartford, in the State of Connecticut, have invented certain new and useful Improvements in Odometers, of which the following is a specification, reference being had to the accompanying drawings, forming a part hereof.

This invention relates to the means for actuating hub odometers for motor and other vehicles, which are mounted within casings secured to or forming parts of the hubs of the vehicles and rotate therewith, the actuation of the registering mechanism being effected through connections to the stationary axles upon which the wheels are mounted.

The invention is particularly concerned with the actuating connections and has for its object to provide connections which are suited to special requirements of use.

The invention will be more fully explained hereinafter with reference to the accompanying drawings in which—

Figure 1 is a view partly in end elevation and partly in transverse section of a wheel hub with the invention applied thereto. Fig. 2 is a detail view in section on the plane indicated by the line 2—2 of Fig. 1 looking in the direction of the arrows. Figs. 3 and 4 are detail views, on a larger scale, in section on the plane indicated by the common section line looking in the direction of the arrows 3—3 and 4—4 respectively.

In Figs. 1 and 2 of the drawings enough of a wheel hub $a$ is shown to enable the invention to be understood, a portion of the stationary axle on which the wheel is mounted being indicated by dotted lines at $b$ in Fig. 2. The hub is shown as having formed integrally therewith a cap $c$ which forms a register chamber $c'$, the register chamber being separated from the axle chamber $a'$ by a removable plate $d$ which is provided centrally with a suitable stuffing box $d'$ to exclude grease and dirt from the register chamber $c'$. The cap is provided with a glazed sight opening $c^2$ through which the register $e$ may be read. The register may be of any suitable kind and is shown as secured to the cap with its axis transverse to the axle $b$ by screws $e'$ which also secure a supporting frame $e^2$. The driving shaft $f$ of the register is supported at one end in the register frame and at the other end in the frame $e^2$. It is squared or otherwise suitably formed for a portion of its length, as at $f'$, to receive two pawl carriers $g$ and $h$. The pawl carrier $g$ is provided with one or more spring-pressed pawls $g'$ which engage a stationary, internal ratchet wheel $g^2$ secured to the frame $e^2$. The pawl carrier $h$ is likewise provided with one or more spring-pressed pawls $h'$ which engage an internal ratchet wheel $h^2$. The latter is secured to a sleeve $i$ which is mounted to rotate on the shaft $f$ which carries a worm wheel $i'$ which is engaged by a worm $k$ on a short shaft $k'$ mounted for relative rotation in the hub $d^2$ of the plate $d$ and having a loose connection with the stationary axle $b$. This connection may be of any suitable construction which will prevent rotation of the shaft $k'$ while permitting the necessary relative displacement of the hub and axle. As the shaft $k'$ and its worm $k$ are held from rotation with the hub $c$ and as the register and the worm wheel $i'$ rotate with the hub around the worm $k$, the worm wheel will have imparted to it a relative rotation about the axis of the driving shaft $f$ of the register and, through the internal ratchet wheel $h^2$ and the pawl carrier $h$ and driving shaft $f$, will actuate the register mechanism. Should the vehicle wheel be rotated in the reverse direction the internal ratchet wheel $h^2$ will slip idly over the pawls $h'$ and the pawls $g'$, engaging the stationary, internal ratchet $g^2$, will prevent the register mechanism from being rotated backward.

The details of construction may be varied to suit different conditions of use, and the invention, therefore, is not limited to the precise construction shown.

I claim as my invention:

The combination with a wheel hub, of a register supported by the hub with its axis transverse to the axis of the hub, a worm shaft and worm supported by the hub and adapted to have a loose engagement with the axle of the wheel, a driving shaft for the register mechanism, a worm wheel mounted loosely on the driving shaft, two pawl carriers mounted on the driving shaft to rotate therewith, an internal ratchet wheel connected with the worm wheel and coöperating with one of said pawl carriers and a stationary internal ratchet wheel coöperating with the other of said pawl carriers to prevent reverse rotation of the driving shaft.

This specification signed and witnessed this 10th day of January, 1911.

CURTIS HUSSEY VEEDER.

Signed in the presence of—
CHARLES G. ALLYN,
AMASA TROWBRIDGE.